United States Patent [19]

Baba

[11] Patent Number: 4,536,118

[45] Date of Patent: Aug. 20, 1985

[54] APPARATUS FOR PALLETIZING PRESSINGS

[75] Inventor: Kiyokazu Baba, Komatsu, Japan

[73] Assignee: Kabushiki Kaisha Komatsu Seisakusho, Tokyo, Japan

[21] Appl. No.: 494,327

[22] Filed: May 13, 1983

[30] Foreign Application Priority Data

May 17, 1982 [JP] Japan .................. 57-81615

[51] Int. Cl.³ .................. B65H 31/30; B65H 31/32
[52] U.S. Cl. .................. 414/43; 198/458; 198/459; 198/621; 414/50; 414/98; 414/101; 414/110
[58] Field of Search .................. 414/43, 45, 47, 50, 414/52, 82, 98, 101, 110, 750; 198/458, 459, 621

[56] References Cited

U.S. PATENT DOCUMENTS

| | | | |
|---|---|---|---|
| 3,084,812 | 4/1963 | Johansson | 414/52 X |
| 3,392,852 | 7/1968 | Tegner | 414/45 |
| 3,456,814 | 7/1969 | Bautz | 414/750 X |
| 3,939,994 | 2/1976 | Suzzi | 414/43 X |
| 4,079,843 | 3/1978 | Fischer et al. | 414/45 |
| 4,111,411 | 9/1978 | Graves et al. | 414/50 X |
| 4,121,723 | 10/1978 | Nellen et al. | 414/43 |
| 4,242,024 | 12/1980 | Buta et al. | 414/43 |
| 4,413,941 | 11/1983 | Kollmann | 414/45 X |

FOREIGN PATENT DOCUMENTS

| | | | |
|---|---|---|---|
| 1216791 | 5/1966 | Fed. Rep. of Germany | 414/45 |
| 604778 | 4/1978 | U.S.S.R. | 414/45 |

Primary Examiner—Leslie J. Paperner
Attorney, Agent, or Firm—Armstrong, Nikaido, Marmelstein & Kubovcik

[57] ABSTRACT

Apparatus for palletizing the pressings being delivered in succession by a transfer press system either individually or in closely positioned pairs. Included are separators for separating each closely positioned pair of pressings away from each other while they are being transferred along a predetermined path from the final press station to a stacking station. At the latter station the successive pressings are deposited on a carriage to form one or two stacks thereon. The carriage transports the stack or stacks of pressings to a pickup station, where the stack or stacks are picked up from the carriage by a loader or loaders, thereby subsequently carried to a loading station or stations, and loaded on a pallet or pallets. As disclosed, the apparatus further comprises a system of conveyors for transporting empty pallets to, and loaded pallets from, the loading stations.

9 Claims, 8 Drawing Figures

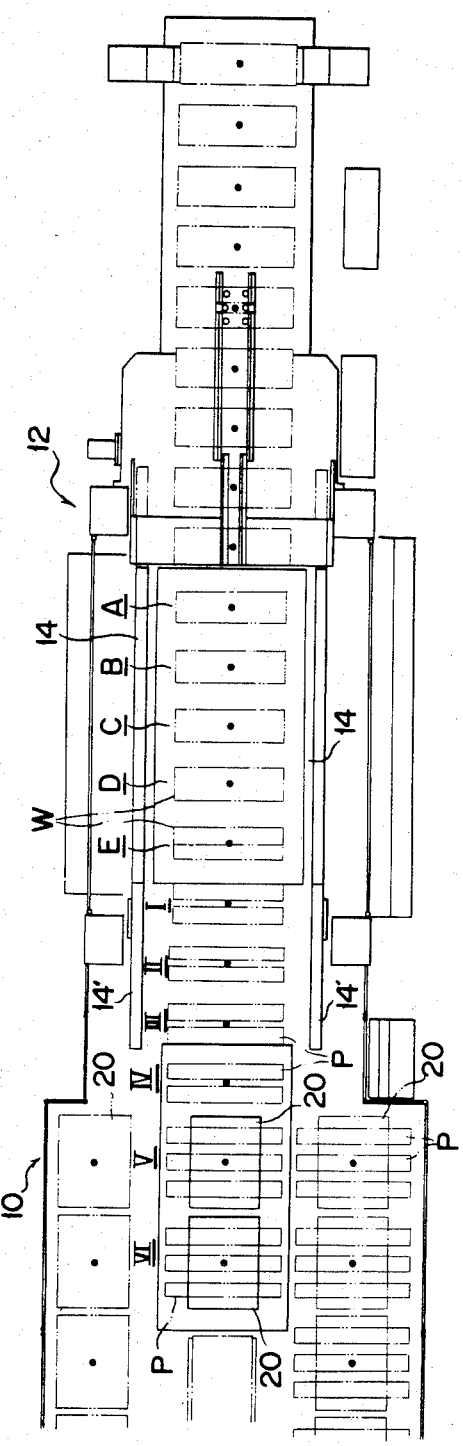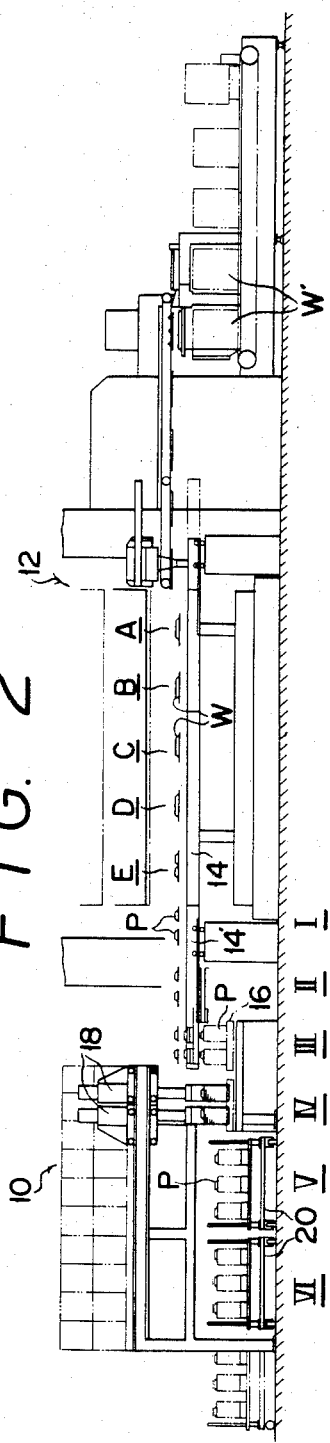

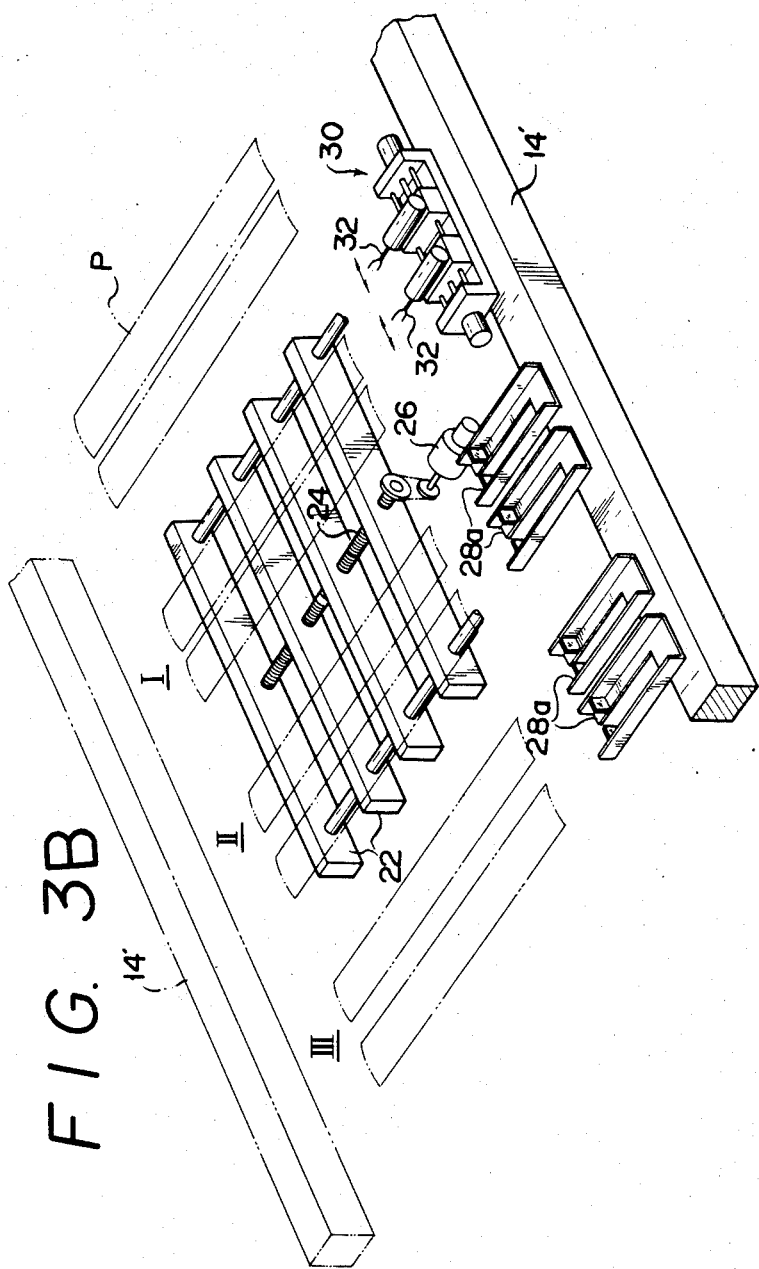

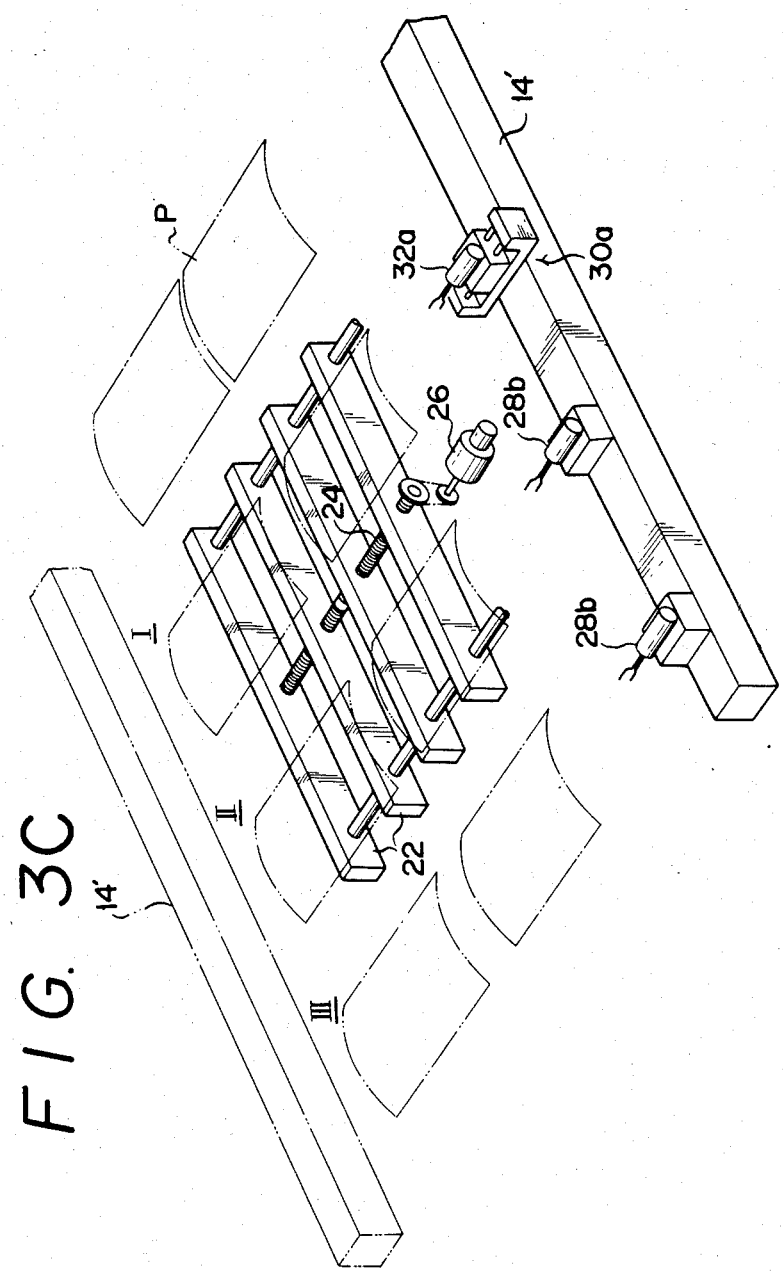

APPARATUS FOR PALLETIZING PRESSINGS

BACKGROUND OF THE INVENTION

This invention relates in general to apparatus for loading articles on pallets, and in particular to apparatus suitable to be incorporated with a transfer press system for automatically palletizing the pressings being delivered thereby.

As is well known, the transfer press system is a streamlined machine having a succession of press stations through which workpieces are transferred one after another for the continuous fabrication of various panel products. The palletization of the pressings of varied shapes and sizes made by the transfer press system requires apparatus specially designed to this end.

A difficulty arises in connection with the palletization of the pressings as each workpiece may be either wholly processed into a single pressing or split into a pair of pressings by the transfer press system. Further the workpieces may be split either longitudinally or transversely with respect to their traveling direction through the press line. Each closely positioned pair of pressings, formed by the severance of a workpiece, must be spaced away from each other preparatory to palletization.

SUMMARY OF THE INVENTION

The present invention provides apparatus for efficiently palletizing the pressings made by a transfer press system, with facilities for separating each closely positioned pair of pressings prior to palletization.

Broadly the palletizing apparatus in accordance with the invention is intended for use with a transfer press system which fabricates and delivers a succession of pressings either individually or in closely positioned pairs. The palletizing apparatus includes transfer means for transferring the pressings along a predetermined path to a stacking station. Disposed on the path of the pressings are means for separating each closely positioned pair of pressings away from each other as required. At the stacking station the transfer means deposit the successive pressings on a carriage to form one or two stacks thereon. The carriage transports the stack or stacks of pressings to a pickup station. Loader means pickup the stack or stacks of pressings from the carriage at the pickup station and transport the same to a loading station or stations for loading on a pallet or pallets.

Other features and advantages of the present invention will become apparent, and the invention itself will best be understood, from the following description and appended claims taken together with the attached drawings showing a preferred embodiment of the invention.

BRIEF DESCRIPTION OF THE DRAWINGS

FIG. 1 is a diagrammatic plan of the apparatus constructed in accordance with the invention and incorporated with a transfer press system for palletizing the pressings being produced and delivered thereby;

FIG. 2 is a diagrammatic side elevation of the palletizing apparatus and transfer press system of FIG. 1;

FIG. 3B is a view similar to FIG. 3A but explanatory of the way in which each closely positioned pair of pressings, produced by splitting a workpiece transversely with respect to its traveling direction, are separated from each other while being transferred from the final press station to the stacking station;

FIG. 3C is also a view similar to FIG. 3A but explanatory of the way in which each closely positioned pair of pressings, produced by splitting a workpiece longitudinally with respect to its traveling direction, are separated from each other while being transferred from the final press station to the stacking station;

DESCRIPTION OF THE PREFERRED EMBODIMENT

Figure 3A:
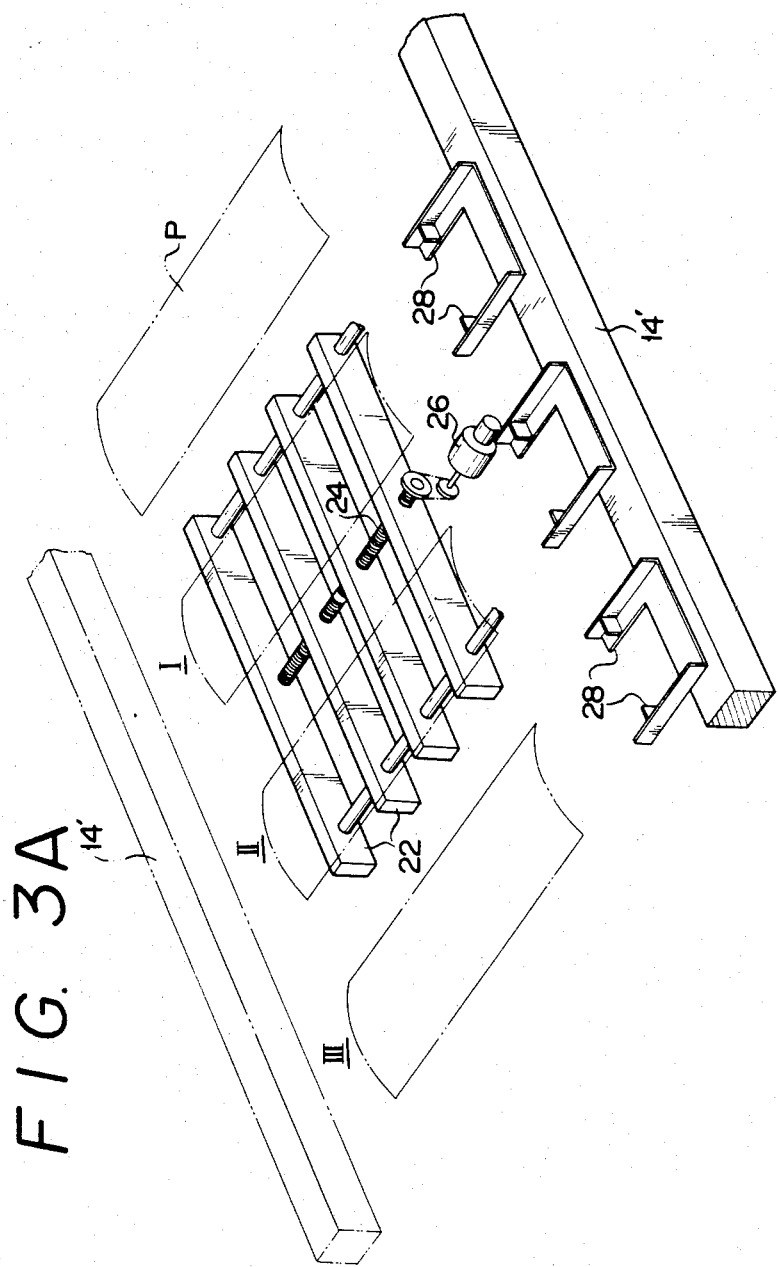
FIG. 3A is an enlarged perspective view explanatory of the way in which pressings fabricated wholly from workpieces by the transfer press system are transferred from its final press station to a stacking station of the palletizing apparatus.

The palletizing apparatus embodying the principles of the invention is generally designated 10 in FIGS. 1 and 2 and is therein shown appended to the output end of a known transfer press system 12. The transfer press system is conventionally equipped with a work indexing mechanism comprising a pair of parallel spaced transfer bars 14 extending longitudinally of the press system. Also as is well known, the work indexing mechanism has means, not shown, for moving the pair of transfer bars up and down, toward and away from each other, and back and forth. By the repetition of these motions in a prescribed sequence the transfer bars act to transfer successive workpieces W through a series of press stations designated A, B, C, D and E. Further the transfer bars function to feed the workpieces one by one into the press line from their piles indicated at W' in FIG. 2, and to deliver the completed pressings P from the final press station E to the palletizing apparatus 10 of this invention.

The palletizing apparatus 10 in accordance with the invention has six processing stations in series arranged posteriorly of the press stations A through E. These are:

1. First and second separating stations I and II, immediately following the final press station E, where each closely positioned pair of pressings are separated from each other.

2. A stacking station III where the pressings P, including those which have been separated at the separating stations, are stacked on a carriage 16.

3. A pickup station IV where the stack or stacks of pressings on the carriage 16 are picked up by a loader or loaders 18.

4. Two loading stations V and VI where the stack or stacks of pressings are loaded by the loader or loaders 18 on a pallet or pallets 20.

An inspection of FIGS. 1 and 2 will indicate that the pair of transfer bars 14 of the transfer press system 12 has leftward extensions 14'. The transfer bar extensions 14' terminate at, or just beyond, the stacking station III. The pressings P are transported from first separating station I to stacking station III by the transfer bar extensions 14'.

As seen in FIGS. 3A, 3B and 3C, a set of skid bars 22 are disposed at the two separating stations I and II. The skid bars 22 lie between the pair of transfer bar extensions 14' and extend along the same in parallel spaced relation to each other. An oppositely threaded rod 24 extends across the skid bars 22 and is threadedly engaged therewith. One end of the threaded rod 24 is coupled to a reversible electric motor 26. Thus, upon rotation of this motor in opposite directions, the spacings between the skid bars 22 are infinitely variable to adjust to the transverse dimension of the pressings P or to the distance between the pair of transfer bar extensions 14' when these are moved toward each other.

FIGS. 3A through 3C are also explanatory of the manners in which various types of pressings travel through the separating stations I and II. If the pressings P have been fabricated by the transfer press system 12 each from one workpiece W, as in FIG. 3A, then such pressings are just carried through the separating stations I and II to the stacking station III by carriers 28 affixed to the transfer bar extensions 14', without in any way being processed while being so transferred.

In FIG. 3B are shown a separator mechanism 30 and carriers 28a attached to the pair of transfer bar extensions 14' for use with closely positioned pairs of pressings P each formed by transversely splitting a workpiece at the final press station E as will be seen by referring back to FIG. 1 or 2. The separator mechanism 30 comprises a pair of grippers 32 on each transfer bar extension 14' which are movable toward and away from each other in the longitudinal direction of the transfer bar extension. Gripped by the two pairs of grippers 32, each closely positioned pair of pressings are separated a required distance away from each other while being transferred from final press station E to first separating station I. After landing on the set of skid bars 22 at the first separating station I, the successive separated pressings P are carried through the second separating station II to the stacking station III by the carriers 28a on the transfer bar extensions 14'.

Each workpiece may be split at the final press station E into a pair of pressings longitudinally with respect to its traveling direction. Each closely positioned pair of pressings thus formed must be transversely separated away from each other. FIG. 3C shows at 30a a separator mechanism used to that end. The separator mechanism 30a comprises a pair of grippers 32a mounted on the respective transfer bar extensions 14' for movement toward and away from each other. The grippers 32a move each closely positioned pair of pressings away from each other to a required degree at the first separating station I. Then the transversely separated pairs of pressings are carried through the second separating station to the stacking station III by carriers 28b on the transfer bar extensions 14'.

Figure 4:
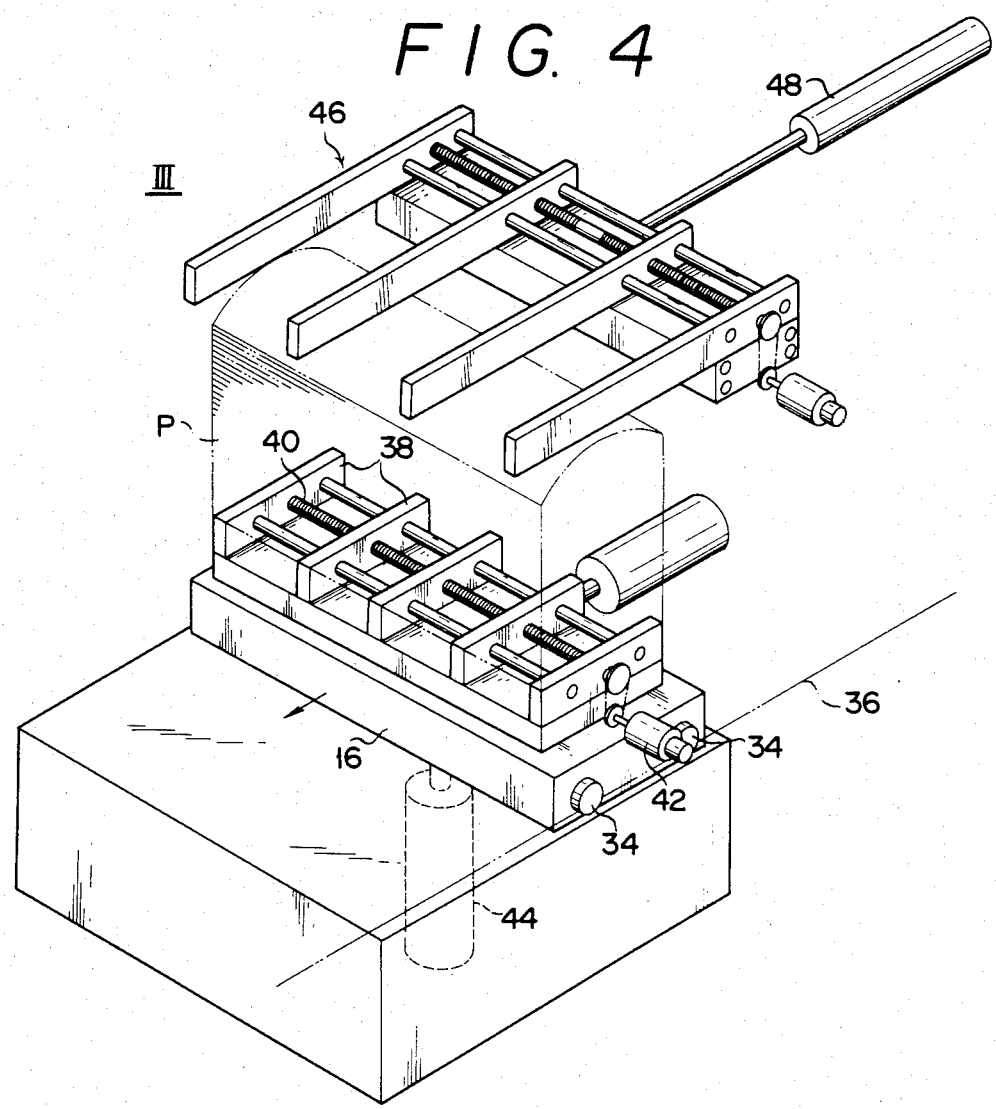
FIG. 4 is an enlarged perspective view of the carriage on which the pressings are stacked at the stacking station, shown together with a fork assembly for receiving and temporarily holding pressings thereon while the carriage is away from the stacking station.

As will be seen by referring back to FIG. 2 in particular, the successive pressings P are to be stacked on the carriage 16 at the stacking station III. FIG. 4 illustrates the carriage 16 in more detail. It is wheeled as at 34 for rolling along a pair of horizontal rails 36 between stacking station III and pickup station IV. Mounted on the carriage 16 are a plurality of parallel spaced bars or plates 38 on which the pressings are to be deposited from the pair of transfer bar extensions 14'. The spacings between these bars are variable by a threaded rod 40 rotated by a motor 42, as required by the size of the pressings to be stacked thereon.

Disposed under the carriage 16 at the stacking station III is a lifter 44 for lifting the carriage to a predetermined level prior to the commencement of the stacking of the pressings thereon. As the successive pressings are deposited on the carriage 16 from the transfer bar extensions 14', the lifter 44 gradually lowers the carriage in order that each pressing may fall the same distance from the transfer bar extensions onto the pressings already stacked on the carriage. Thus is formed one or two stacks of pressings P on the carriage 16.

When loaded fully, the carriage 16 is lowered by the lifter 44 into rolling engagement with the pair of rails 36. Then the carriage 16 transports the stack or stacks of pressings from stacking station III to pickup station IV.

The transfer press system 12 continues the fabrication and delivery of pressings while the carriage 16 is away from the stacking station III. The pressings being released from the transfer bar extensions 14' at the stacking station during this period of time must be received and held by means other than the carriage 16 pending its return to the stacking station.

FIG. 4 also shows a fork assembly 46 provided for the above purpose. Lying just under the transfer bar extensions 14', the fork assembly is thrusted by a fluid actuated cylinder 48 to a working position at the stacking station III upon full loading of the carriage 16. The pressings subsequently released from the transfer bar extensions 14' are stacked on the fork assembly 46. When the carriage 16 returns unloaded from the pickup station IV and is raised by the lifter 44, the fork assembly 46 reloads the stacked pressings on the carriage. Thereafter, with the contraction of the cylinder 48, the fork assembly moves to a retracted position, allowing the subsequently released pressings to stack on the carriage 16.

Figure 5:
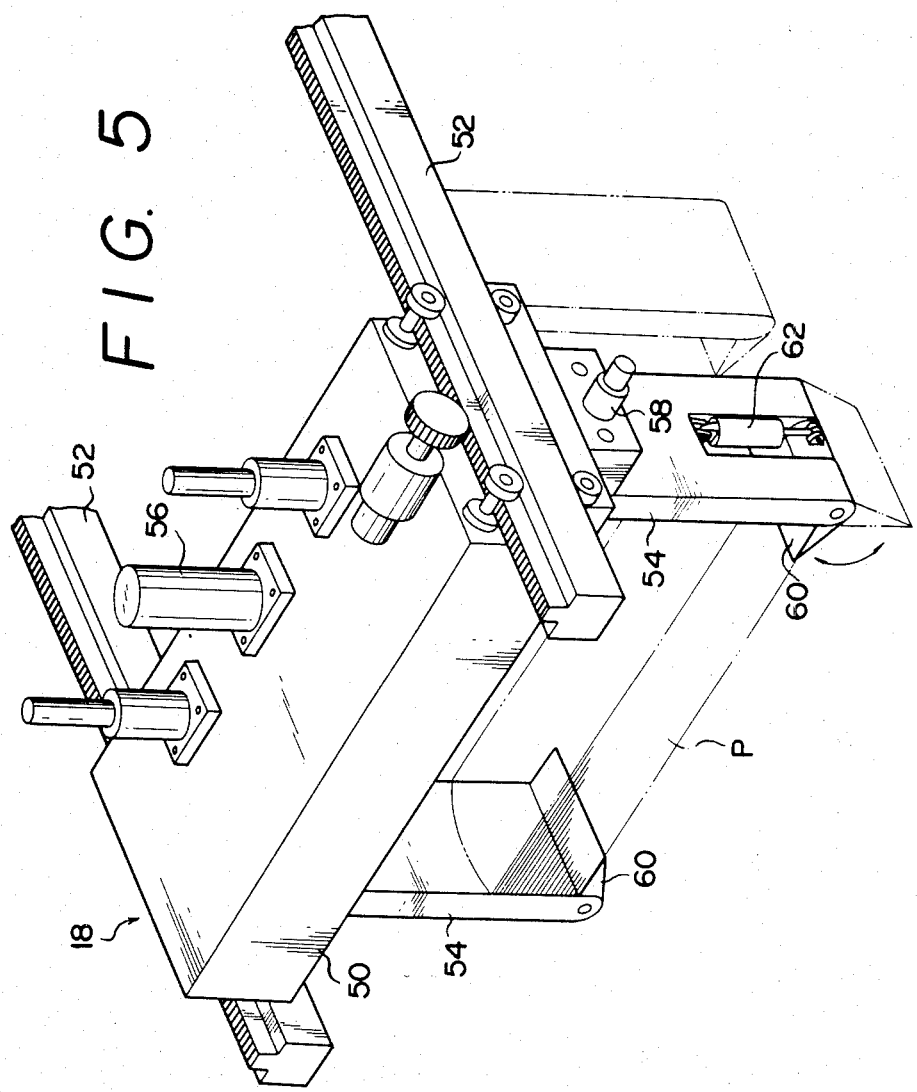
FIG. 5 is an enlarged perspective view of the loaders for picking up the stacked pressings from the carriage for reloading on pallets.

FIG. 5 is a detailed illustration of the loaders 18 for transferring the stacked pressings P from the carriage 16 at the pickup station IV onto the pallets 20 at the loading stations V and VI. Each loader comprises a wheeled, self-propelled carriage 50 movable along a pair of rails 52 laid horizontally at a required height above the plant floor. Depending from the opposite sides of the carriage 50 are a pair of arms 54 which are jointly movable up and down relative to the carriage by a fluid actuated cylinder 56 and at least one of which is further movable toward and away from the other by a bidirectional electric motor 58. The pair of depending arms 54 have foldable end members 60 mounted on their bottom ends for pivotal motion between vertical and horizontal positions by fluid actuated cylinders 62.

If only one stack of pressings is formed on the carriage 16 at the stacking station III and thereby carried to the pickup station IV, as in the case of the pressings explained in connection with FIG. 3A, then one of the loaders 18 is sent to the pickup station for picking up the stack of pressings P from the carriage 16 by the pair of depending arms 54, with their end members 60 folded inwardly as depicted by the solid lines in FIG. 5. The loader 18 subsequently travels back to either of the loading stations V and VI to load the stack of pressings P on a pallet 20.

If two stacks of pressings are formed on the carriage 16 at the stacking station III, both loaders are caused to travel to the pickup station IV for picking up the respective stacks from the carriage. The loaders may then be moved to the loading stations V and VI for loading the stacks of pressings on pallets 20.

Figure 6:
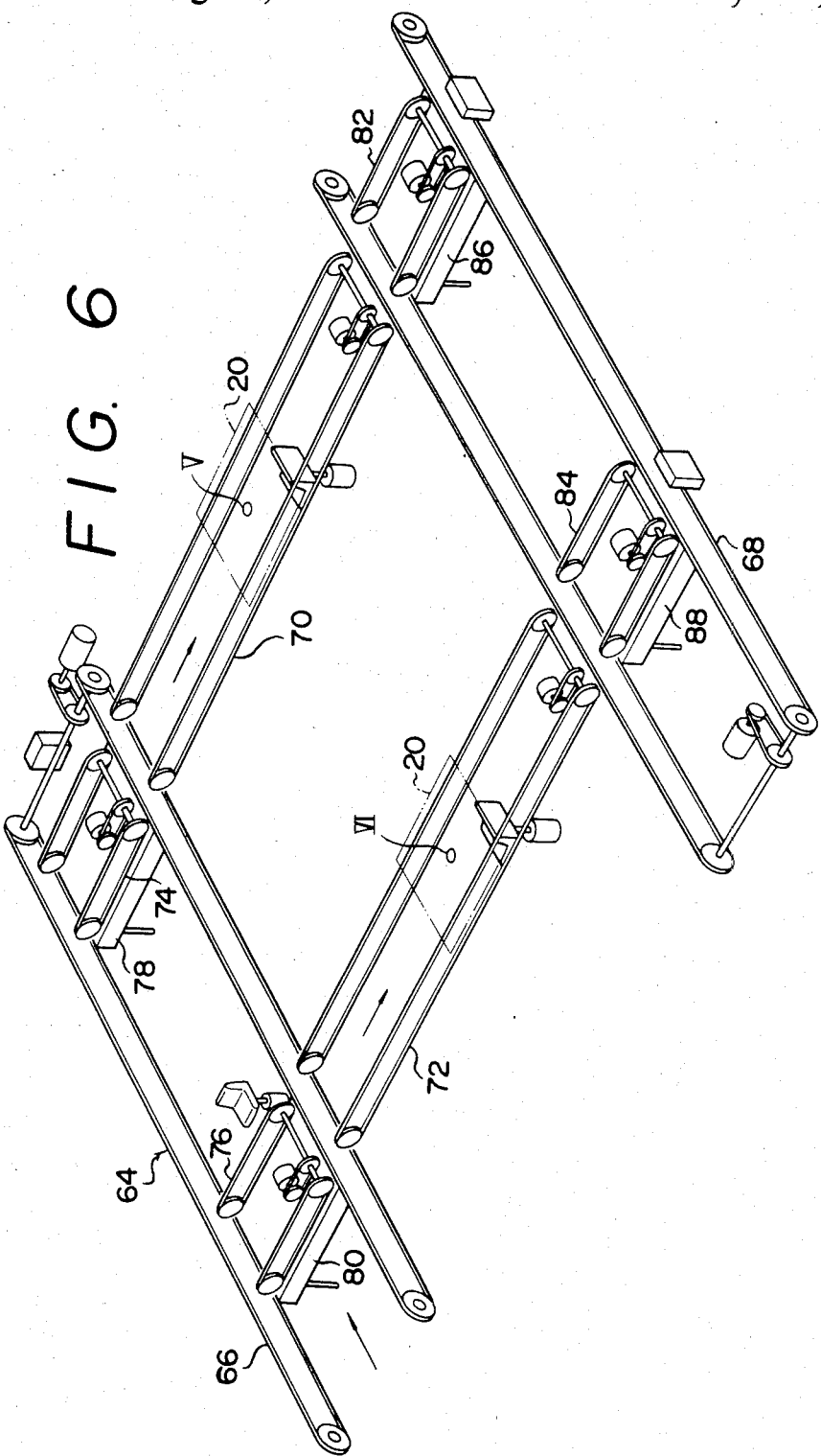
FIG. 6 is an enlarged perspective view of a conveyor arrangement for the transportation of empty pallets to, and of loaded pallets from, the loading stations where the stacked pressings are loaded on the pallets by the loaders.

The present invention further contemplates the provision of a conveyor system for the transportation of empty pallets to, and of loaded pallets from, the two loading stations V and VI. FIG. 6 illustrates the conveyor system in detail. Generally designated 64, the conveyor system comprises an infeed conveyor 66 and a delivery conveyor 68 disposed in parallel spaced relationship to each other on opposite sides of the pair of rails 52, FIG. 5, along which the loaders 18 reciprocate between pickup station IV and loading stations V and VI. As the names imply, the infeed conveyor 66 function to carry successive empty pallets 20 toward the loading stations V and VI, and the delivery conveyor 68 to carry loaded pallets away from the loading stations for storage or shipment.

Arranged between the infeed 66 and delivery 68 conveyors are a first branch conveyor 70 extending across the first loading station V and a second branch conveyor 72 extending across the second loading station VI. At the junctions of the infeed conveyor 66 and the two branch conveyors 70 and 72 there are provided turn conveyors 74 and 76 of short extent on respective platforms 78 and 80 for the right-angular change of direction of the empty pallets from the infeed conveyor to the branch conveyors. Similar turn conveyors 82 and 84 are mounted on respective platforms 86 and 88 at the junctions of the delivery conveyor 68 and the two branch conveyors 70 and 72 for the right-angular change of direction of the loaded pallets from the branch conveyors to the delivery conveyor.

Thus the successive empty pallets 20 travel to the right on the infeed conveyor 66. At its junctions with the branch conveyors 70 and 72 the turn conveyors 74 and 76 transfer the empty pallets from the infeed conveyor onto the respective branch conveyors. The branch conveyors 70 and 72 carry the empty pallets to the respective loading stations V and VI. On being loaded with the pressings at these stations in the above described manner, the pallets travel on the branch conveyors 70 and 72 toward the delivery conveyor 68 and ride thereon with the aid of the turn conveyors 82 and 84. Then the delivery conveyor 68 transports the loaded pallets toward a place of storage or shipment.

The foregoing disclosure will have made clear that there has been invented apparatus which will greatly expedite the palletization of the pressings made by a transfer press system. The apparatus lends itself to automation, as will be readily recognized by the specialists. A variety of modifications and alterations may also be contemplated and resorted to by one skilled in the art without departing from the spirit or scope of the invention as expressed in the following claims.

What is claimed is:

1. A materials handling system for separating, sorting and stacking fabricated parts comprising:
   (a) a transfer means for conveying fabricated parts away from a fabricating device;
   (b) a separating means receiving said fabricated parts from said transfer means comprising a means for separating said fabricated parts in a lateral direction with respect to a direction of transfer, a means for separating said fabricated parts in a longitudinal direction with respect to said direction of transfer and a means for conveying said parts during and after separation away from said transfer means;
   (c) a wheeled carriage having at its upper surface a plurality of parallel receiving bars or plates and adapted to receive said fabricated parts from said separating means;
   (d) a lifting means situated beneath said carriage when said carriage is in a position to receive fabricated parts from said separating means, said lifting means being capable of raising said carriage to a point for reception of said fabricated parts from said separating means and lowering said carriage in a step-wise fashion so as to cause said fabricated parts to be stacked vertically upon said carriage;
   (e) an intermediate collection means interposable between said separating means and said carriage and adapted to receive a limited number of said fabricated parts;
   (f) one or more moveable overhead loading means comprising one or more overhead rails, a frame engaging said one or more of said overhead rails, depending arms projecting downward from said frame, and foldable end members pivotally attached to an end of said depending arms opposite to said frame, said overhead loading means being adapted to remove said stacked fabricated parts from said carriage;
   (g) loading stations at one or more locations situated beneath said overhead rails where said fabricated parts are discharged from said overhead loading means onto pallets; and
   (h) means for supplying and removing said pallets from said loading stations.

2. The materials handling system according to claim 1 wherein said transfer means comprises a plurality of skid bars adjustable in overall width, and at least two parallel spaced transfer bars extending longitudinally from said fabricating device on opposite sides of said skid bars, said transfer bars having carrying portions on their upper surfaces formed as brackets firmly mounted to said transfer bars and projecting inwardly from said bars so as to cradle said fabricated pieces, said brackets being spaced such that when said transfer bars reciprocate in tandem, said fabricated pieces are lifted from said skid bars, advanced to a new position, and deposited upon said skid bars.

3. The materials handling system according to claim 1 wherein said separating means for separating said fabricated pieces in a lateral direction comprises two or more gripping means affixed to each upper surface of a pair of parallel transfer bars, said gripping means being controllably projected toward each other to grip a lateral projection of said fabricated pieces and retractable so as to draw said fabricated pieces toward said transfer bars, and a plurality of skid bars, being adjustable in overall width, located between said transfer bars.

4. The materials handling system according to claim 1 wherein said separating means for separating said fabricated pieces in a longitudinal direction comprises a pair of gripping means attached to each of a pair of parallel transfer bars, said gripping means being movable towards and away from each other in the longitudinal direction of the transfer bar, and a plurality of skid bars being adjustable in overall width and located between said transfer bars.

5. The materials handling system according to claim 1 wherein said carriage comprises a frame, two pairs of wheels affixed to said frame engageable in tracks and a plurality of parallel spaced bars or plates which are adjustable to accommodate pieces of different sizes so as to provide an overhang of said pieces beyond the edges of at least two opposite sides of said parallel bars or plates.

6. The materials handling system according to claim 1 wherein said lifting means is engageable with said carriage so as to elevate said carriage to a position wherein the parallel bars or plates of said carriage are level with said separating means and is adjustable downwardly so that a top piece supported by said carriage is maintained at said position during transfer of each fabricated piece to said carriage and is retractable so as to return said carriage to a surface upon which said carriage rests.

7. The materials handling system according to claim 1 wherein said intermediate collection means comprises a fork assembly parallel to said separating means and adjustable to the width of said separation means, said fork assembly having tines, a mounting means for said fork assembly, a rod affixed to said mounting means and projecting parallel to the tines of said fork assembly, and an hydraulically actuated cylinder into which said rod is inserted, which cylinder projects and retracts said fork assembly so as to place said fork assembly in a position approximating that where said carriage receives said fabricated pieces from said separating means at such times when said carriage is displaced from said receiving position.

8. The materials handling system according to claim 1 wherein said loading stations are supplied with pallets and loaded pallets are withdrawn by means including a system of endless belts.

9. The materials handling system according to claim 1 wherein said transfer means and said separation means are attached to a common pair of transfer bars.

* * * * *